(12) United States Patent
Newberg et al.

(10) Patent No.: US 8,439,434 B2
(45) Date of Patent: May 14, 2013

(54) ROOF PANELS FOR AN AUTOMOTIVE VEHICLE

(75) Inventors: Travis Newberg, Columbus, OH (US); Yousuf Riad, Dublin, OH (US); Michael P. Hullihan, Columbus, OH (US); Christopher David Hall, Dublin, OH (US); Joshua Kramer, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/184,883

(22) Filed: Jul. 18, 2011

(65) Prior Publication Data

US 2013/0020823 A1 Jan. 24, 2013

(51) Int. Cl.
*B60J 7/08* (2006.01)
(52) U.S. Cl.
USPC ........................................ 296/218; 296/24.44
(58) Field of Classification Search .................. 296/218, 296/107.19, 107.2, 24.44
See application file for complete search history.

(56) References Cited

U.S. PATENT DOCUMENTS

| | | | |
|---|---|---|---|
| 3,357,738 A | 12/1967 | Bourlier | |
| 4,171,078 A * | 10/1979 | Morgan | 224/550 |
| 4,467,944 A * | 8/1984 | Manko et al. | 224/42.32 |
| 4,718,710 A * | 1/1988 | Iwamura et al. | 296/37.1 |
| 5,421,635 A | 6/1995 | Reinsch et al. | |
| 5,707,101 A * | 1/1998 | Rice | 296/193.04 |
| 6,474,731 B2 | 11/2002 | De Gaillard | |
| 6,497,351 B1 * | 12/2002 | Peele, Jr. | 224/563 |
| 6,623,064 B2 | 9/2003 | Schütt et al. | |
| 6,672,658 B2 | 1/2004 | De Gaillard | |
| 7,497,496 B2 | 3/2009 | Kielmann et al. | |
| 7,611,189 B2 * | 11/2009 | Nielander et al. | 296/146.8 |
| 2002/0084678 A1 | 7/2002 | Schütt et al. | |
| 2004/0090092 A1 * | 5/2004 | de Gaillard et al. | 296/222 |
| 2004/0145219 A1 | 7/2004 | Doncov et al. | |

FOREIGN PATENT DOCUMENTS

| | | | |
|---|---|---|---|
| DE | 2929915 | * | 2/1981 |
| EP | 0101322 | * | 2/1984 |
| JP | 6-179323 | | 6/1994 |

* cited by examiner

*Primary Examiner* — Dennis Pedder
(74) *Attorney, Agent, or Firm* — Fay Sharpe LLP

(57) ABSTRACT

An automotive vehicle having a front end, a rear end, and a longitudinal axis. The vehicle includes a passenger compartment disposed between the front end and the rear end. A roof overlies the passenger compartment. The roof is comprised of a pair of roof beams extending parallel to the longitudinal axis adjacent opposed sides of the vehicle. A first forward transverse beam extends between the roof beams. A second rearward transverse beam extends between the first and second roof beams. A first removable roof panel closes a space between the first and second transverse beams. A second removable roof panel closes a space rearward of the second transverse beam. The roof panels can be assembled to form a shelf in a storage compartment of the vehicle.

5 Claims, 5 Drawing Sheets

ROOF PANELS FOR AN AUTOMOTIVE VEHICLE

BACKGROUND

The present exemplary embodiment relates to an automotive vehicle top and, more particularly, to an automotive vehicle that can be converted from a covered top to an open top (convertible).

It is well recognized that automotive vehicles with a top that can be opened are popular amongst a large section of drivers. In the construction of such automotive vehicles, it has been a common practice to produce an automotive vehicle with a convertible top made of canvas or the like which folds into a rear position in the automobile. Such convertible automobiles, however, have had a number of drawbacks, not the least of which is the fact that the canvas is loose, is apt to leak, easy to break into, and makes a considerable amount of noise when the automobile is moving along the road. In addition, in the wintertime, it is difficult to keep an automotive vehicle having such a flexible convertible top warm because it has low thermal insulation properties and may include openings allowing leakage of warm air from the interior of the car.

Hardtop convertible roofs have also been employed in the automotive industry. Hardtops typically are movable from a closed position above a passenger compartment to a retracted position within a bootwell or trunk. Generally speaking, hard top roofs have required space-consuming storage and cumbersome installation procedures. Moreover, typically a storage space is created for the hard top roof pieces and such a storage space necessarily reduces space available for rear seating and/or a trunk. Alternatively, in certain vehicles, the vehicle hardtop has been removeable for remote storage. Obviously, this is problematic if unexpected inclement weather is encountered.

BRIEF DESCRIPTION

Various details of the present disclosure are hereinafter summarized to facilitate a basic understanding, however this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to a first embodiment, an automotive vehicle having a passenger compartment including seats adjacent a rear of the passenger compartment is provided. A storage area is located behind the seats. A removable roof panel overlies the passage compartment. The roof panel is moveable between its roof top position and a position forming a shelf within the storage area.

According to a second embodiment, an automotive vehicle having a front end, a rear end, and a longitudinal axis is provided. The vehicle includes a passenger compartment disposed between the front end and the rear end. A roof assembly overlies the passenger compartment. The roof assembly is comprised of a pair of roof beams extending at least substantially parallel to the longitudinal axis adjacent opposed sides of the vehicle. A forward transverse beam extends between the roof beams. A rearward transverse beam also extends between the roof beams. A first removable roof panel fills a space between the first and second transverse beams. A second removable roof panel fills a space behind the second transverse beam.

According to a further embodiment, an automotive vehicle having a convertible roof is provided. The roof includes a plurality of cross-beams defining at least two openings and at least two removable roof panels sealing the openings. The removable roof panels can selectively form a shelf within a storage area of the vehicle.

BRIEF DESCRIPTION OF THE DRAWINGS

The following description and drawings set forth certain illustrative embodiments of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1A:
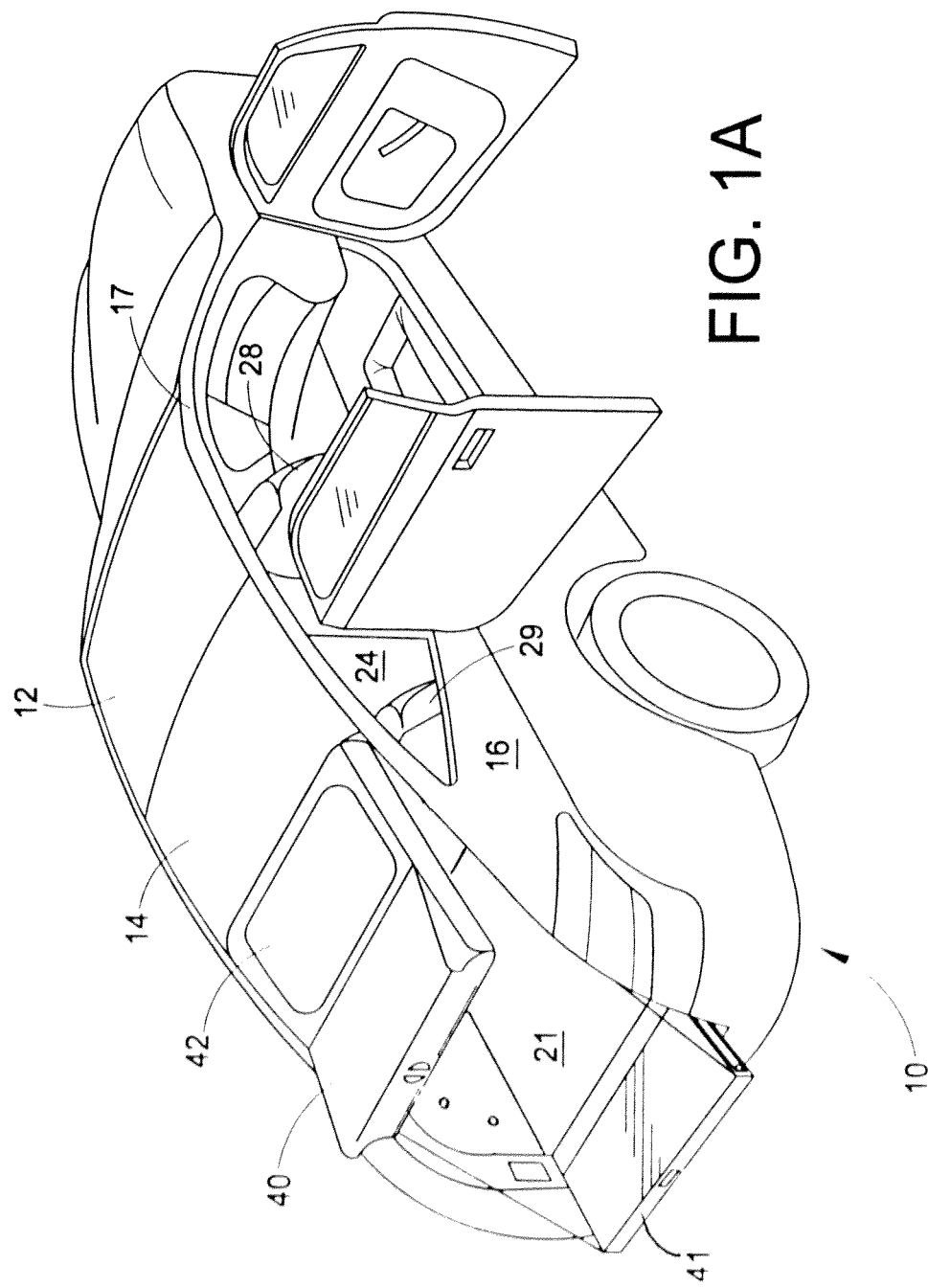
FIGS. 1A and 1B and 1C are perspective views of an automotive vehicle transformed from a covered roof top to an open roof top.
Figure 1B:
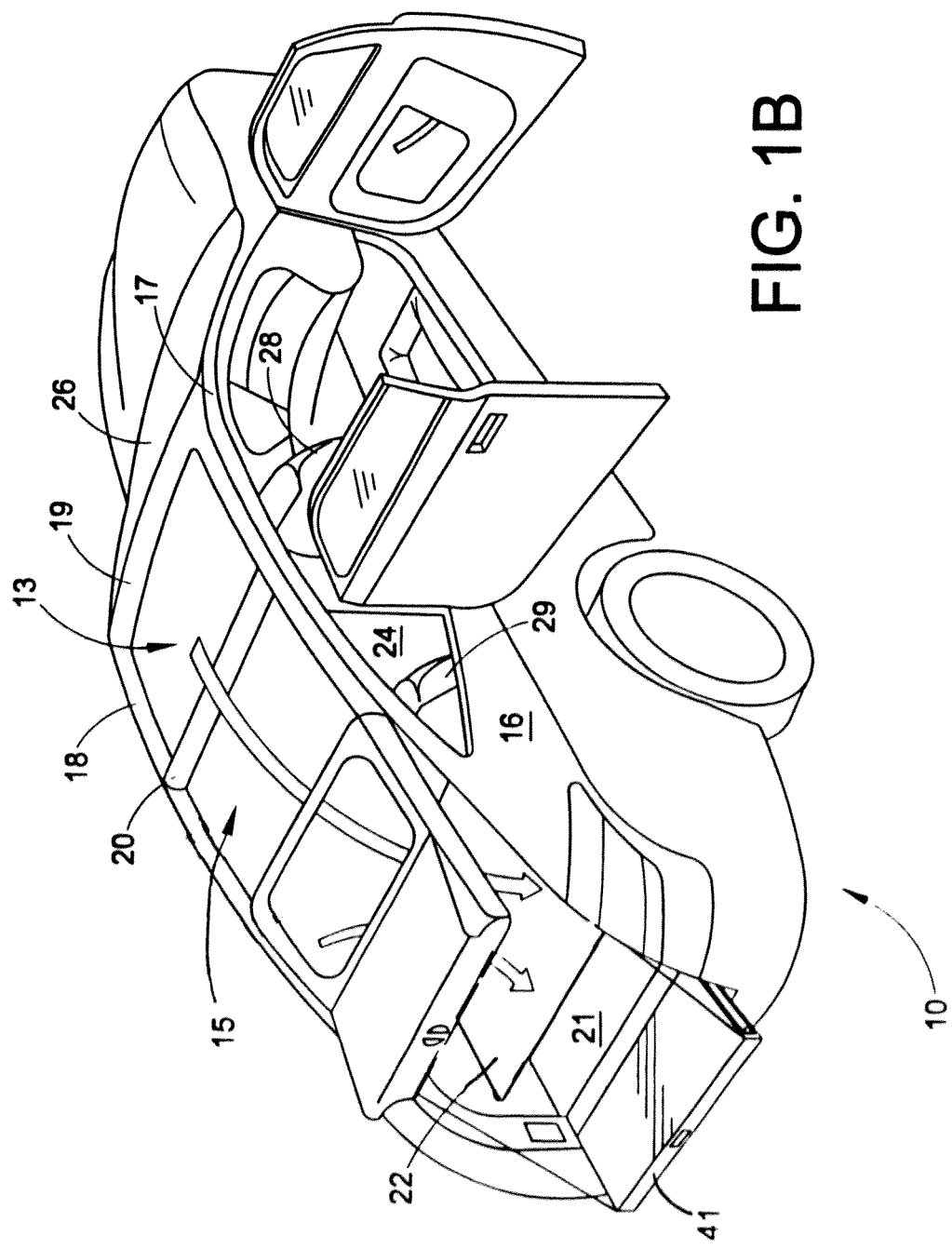
Figure 1C:
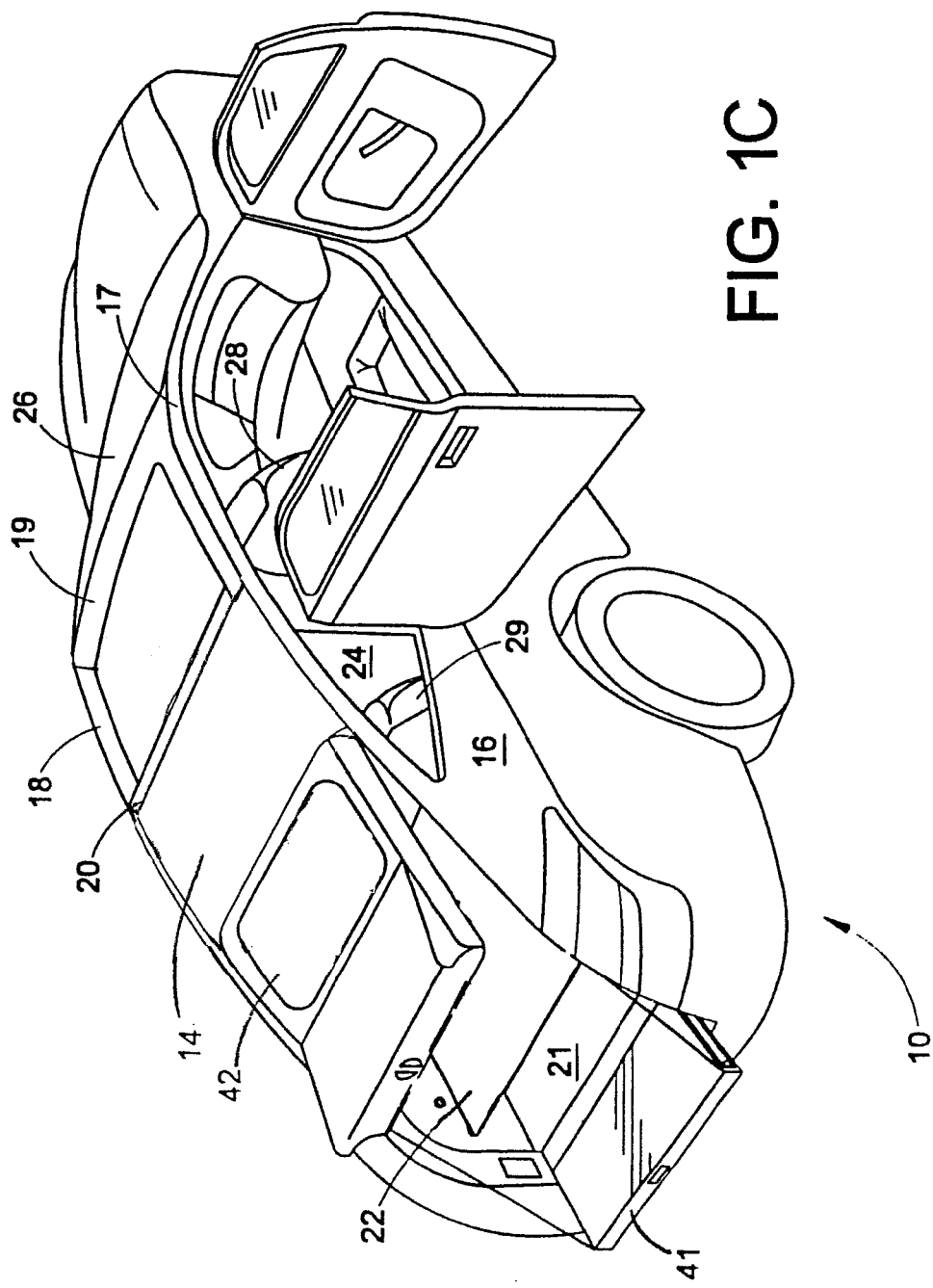

With reference to FIGS. 1A and 1B, a convertible automotive vehicle 10 is depicted. In FIG. 1A, vehicle 10 is shown with a first roof panel 12 and a second roof panel 14 installed on the vehicle and filling roof top openings 13 and 15, respectively (see FIG. 1B). Each of roof panels 12 and 14 are removably secured to the body 16 of automotive vehicle 10. More particularly, roof panels 12 and 14 are secured to one or both side roof beams 17 and 18 and/or transverse beams 19 and 20. Side beams 17 and 18 extend generally parallel to the longitudinal axis of vehicle 10. The roof panels 12 and 14 are selectively detachable and manually repositionable into a rear storage compartment 21 to form a shelf 22. FIG. 1C depicts a state of conversion wherein roof panel 12 has been detached from the side roof beams and repositioned into rear storage compartment 21 while roof panel 14 remains affixed to the roof beams.

Roof panels 12 and 14 can have a length or width corresponding to the width of rear storage compartment 21. In this manner, roof panels 12 and 14 are relatively easily mated with the sidewalls of the storage compartment 21 to form shelf 22. Roof panels 12 and 14 can also have the same dimensions, including at least one of width and length and optionally both. This facilitates the stacking of roof panels 12 and 14 in rear storage compartment 21 to form shelf 22. For example, panels 12 and 14 could be received within corresponding slots formed within the opposed side walls defining the storage are 21. Alternatively, the side walls could include tabs or an integral shoulder pon which panels 12 and 14 could ne rested.

Opening 13 is provided above passenger compartment 24 and is defined by side beams 17 and 18, forward transverse beam 19, which is positioned adjacent the automotive vehicle windshield 26, and rearward transverse beam 20. Rearward transverse beam 20 also extends between the first and second side beams 17 and 18 and overlies a generally central region of the passenger compartment 24. Moreover, transverse beam 20 can be positioned above the passenger compartment between front passenger seating area 28 and rear passenger seating area 29. This advantageously provides a structural integrity to the passenger compartment 24 above the seated occupants.

Rear hatch back 40 can be rotatably secured to a further transverse beam or may include its own structural component extending between the first and second longitudinal side beams 17 and 18. Rear hatch back 40 mates with a rotatable tailgate 41 to close rear storage compartment 21.

To further enhance the convertible nature of the automotive vehicle 10, rear hatchback 40 is provided with a removable window element 42. Window 42 can be stackable upon roof panels 12 and 14 in their shelf position. Alternatively, window 42 may be nested between roof panels 12 and 14 or stored in a remote location. Advantageously, the amount of open roof is tailorable by the occupants. Moreover, it is feasible to remove one or both of panels 12 and 14 and optionally rear window 42. In contrast, most convertible vehicles are either full open or full closed.

Figure 2:
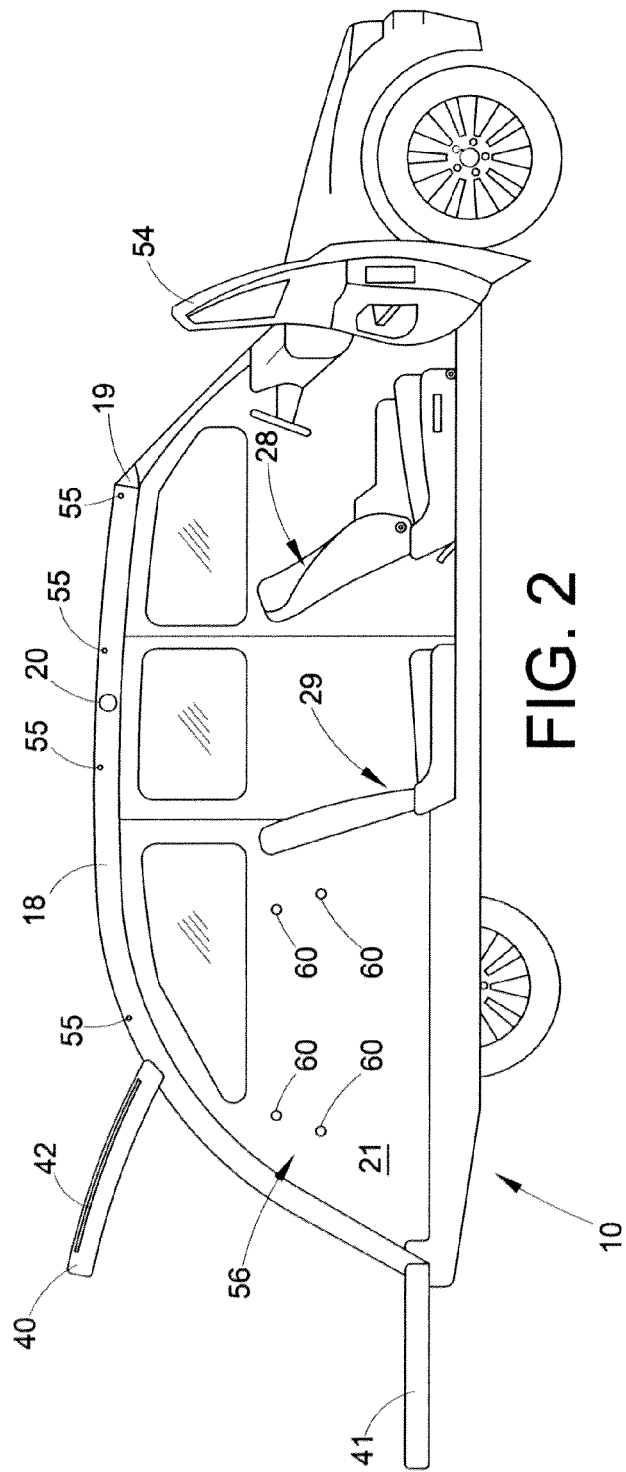
FIG. 2 is a partial side cross-section view of the automotive vehicle of FIG. 1 taken generally along its longitudinal axis with its roof panels removed.
Figure 3:
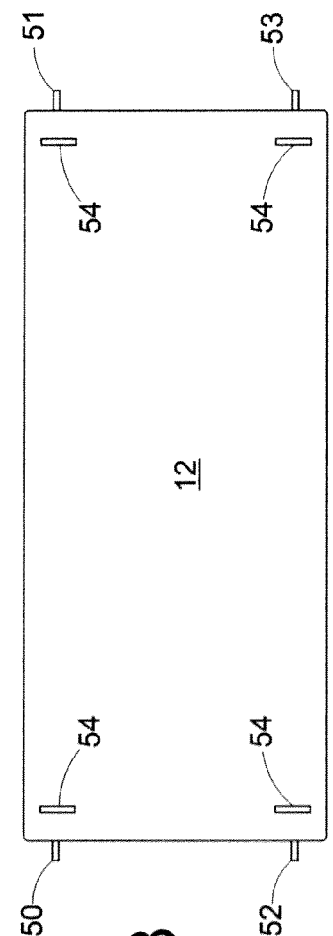
FIG. 3 is a top plan view of a roof panel associated with the vehicle of FIG. 2.

Turning now to FIGS. 2 and 3, an alternative mechanism for securing the panels 12 and 14 both as roof members and as shelf members is depicted. Roof panels 12 and 14 include a plurality of retractable pins 50-53 which facilitate attachment to automotive vehicle 10. Only panel 12 is shown because panel 14 is substantially identical thereto. Panels 12 and 14 include biased retention pins 50-53 which are retractable via handles 54. Pins 50-53 can be spring biased outwardly to securely engage recesses 55 in automotive vehicle side beams 17 (not shown) and 18.

The roof panels 12 and 14 can be manually removed by simultaneously retracting forward pins 50 and 51 via handles 54, rotating roof panel 12 upwardly about the axis created by rear pins 52 and 53, releasing forward pins 50 and 51, and resting the extended pins against the automotive vehicle beams 17 and 18. Subsequently, rear pins 52 and 53 can be retracted and the roof panel 12 separated from the vehicle 10. Of course, any order of detachment from the automotive vehicle is feasible. Furthermore, it is envisioned that a pair of handles could activate corresponding pin sets (50-51) and (52-53) or even a single handle could activate all four pins simultaneously.

To assemble the removable roof panels 12 and 14 into a shelf position, the side walls 56 of rear storage compartment 21 are provided with holes 60 to receive the pins 50-53 of roof panels 12 and 14 to create the shelf assembly 18 (see FIG. 1B).

Figure 4:
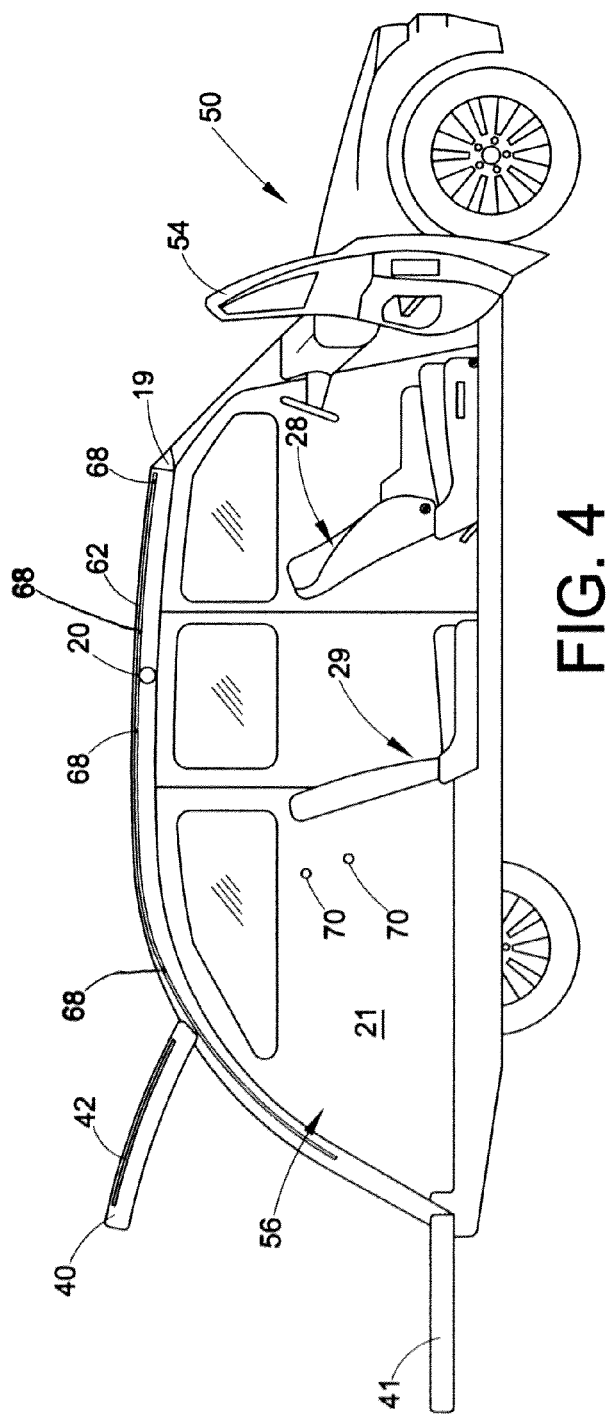
FIG. 4 is a partial side cross-section view of an alternative vehicle embodiment taken generally along its longitudinal axis with its roof panels removed.
Figure 5:
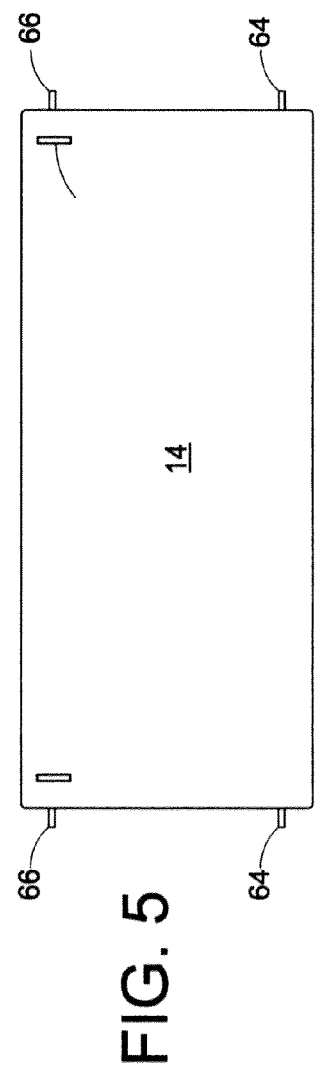
FIG. 5 is a top plan view of a roof panel associated with the vehicle of FIG. 4.

Referring now to FIGS. 4 and 5, an alternative mechanism for transforming the vehicle roof into a shelf is depicted wherein cooperative channels 62 are provided in the automotive vehicle beams 17 (not shown) and 18. Channels 62 provide a path to maneuver roof panels 12 and 14 into a stowed condition as shelf 18. Only panel 14 is depicted because panel 12 can be substantially identical thereto. More particularly, roof panels 12 and 14 are provided with rearward pins 64 received within channel 62. Retractable pins 66 are formed adjacent a forward edge of panels 12 and 14. Retractable pins 66 of panels 12 and 14 are retracted and released from holes 68 and the roof panels 12 and 14 can be slid rearwardly into rear storage compartment 21. Panels 12 and 14 are then individually rotatable into a horizontal position and retractable pins 66 released and received within holes 70 to form a shelf element.

The roof of the present disclosure is advantageous over conventional designs in that it allows for easy retraction and storage of rigid roof panels. In fact, a desirable function (shelf) is provided by stored roof panels. Furthermore, the use of a central cross beam enhances vehicle structural integrity when the roof panels are stowed. The roof system of the present disclosure also advantageously allows independent venting and partial opening of the vehicle roof.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. An automotive vehicle having a front end, a rear end, and a longitudinal axis, the vehicle comprising a passenger compartment disposed between the front end and the rear end, a roof assembly overlying said passenger compartment, said roof assembly comprised of a pair of roof beams, each beam extending substantially parallel to said longitudinal axis adjacent opposed sides of said vehicle, a first transverse beam extending between said pair of roof beams, a second transverse beam extending between said pair of roof beams and disposed rearward of the first transverse beam, a first removable panel closing a space between said first and second transverse beams and a second removable panel closing a space behind said second transverse beam, each of said removable panels including retractable elements suitable for engaging said roof beams, said retractable elements being further suitable for engaging at least two recesses formed in walls defining a storage area of said vehicle.

2. The vehicle of claim 1 wherein said second transverse beam overlies said passenger compartment.

3. The vehicle of claim 2 further comprising a hatchback or a tailgate and wherein said first and second removable panels form a shelf adjacent the hatchback or tailgate.

4. The vehicle of claim 3 wherein one of said hatchback and tailgate includes a removable window.

5. An automotive vehicle comprising a body defining a passenger compartment including seats adjacent a rear of the passenger compartment, a storage area located behind said seats, and at least one of a hatchback and a tailgate to selectively open and close an access opening to said storage area, a first removable roof panel overlying said passenger compartment and a second removable roof panel, said first removable roof panel being moveable between a roof position and a position forming a shelf within said storage area, said shelf being located adjacent said access opening, wherein said first removable roof panel includes retractable pins suitable for retractably mating with holes formed in sidewalls defining said storage area and with one of recesses and channels in said roof.

* * * * *